US009110935B2

(12) United States Patent  
Vundavalli

(10) Patent No.: US 9,110,935 B2  
(45) Date of Patent: Aug. 18, 2015

(54) GENERATE IN-MEMORY VIEWS FROM UNIVERSE SCHEMA

(71) Applicant: Venkatram Vundavalli, Bangalore (IN)

(72) Inventor: Venkatram Vundavalli, Bangalore (IN)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 13/776,714

(22) Filed: Feb. 26, 2013

(65) Prior Publication Data

US 2014/0244690 A1     Aug. 28, 2014

(51) Int. Cl.  
*G06F 17/30*     (2006.01)

(52) U.S. Cl.  
CPC .................. *G06F 17/30289* (2013.01)

(58) Field of Classification Search  
CPC ............. G06F 17/30289; G06F 17/30592; G06F 17/30563  
USPC .................................................. 707/790, 803  
See application file for complete search history.

(56) References Cited

U.S. PATENT DOCUMENTS

| | | | | |
|---|---|---|---|---|
| 8,229,952 | B2 * | 7/2012 | Cras et al. ..................... | 707/769 |
| 8,510,261 | B1 * | 8/2013 | Samantray .................... | 707/602 |
| 2012/0185821 | A1 * | 7/2012 | Yaseen et al. ................. | 717/105 |
| 2013/0297556 | A1 * | 11/2013 | Chen et al. .................... | 707/602 |
| 2014/0114906 | A1 * | 4/2014 | Hegde et al. .................. | 707/602 |
| 2014/0130008 | A1 * | 5/2014 | Amulu .......................... | 717/105 |
| 2014/0149093 | A1 * | 5/2014 | Amulu ............................. | 703/6 |
| 2014/0156634 | A1 * | 6/2014 | Buchmann et al. ........... | 707/714 |
| 2014/0181154 | A1 * | 6/2014 | Amulu et al. ................. | 707/803 |

\* cited by examiner

*Primary Examiner* — Apu Mofiz  
*Assistant Examiner* — Jared Bibbee

(57) ABSTRACT

In one aspect, a Universe designed and built in a database is used for modeling data in an in-memory database. The Universe is loaded in a front-end development application to display a universe schema contained in the Universe. The logic built in the front-end development application enables parsing the universe schema, to determine patterns matching in-memory views such as attribute views and analytic views. The determined patterns are generated as attribute views and analytic views, and displayed for user selection. Selected attribute views and analytic views are stored in the in-memory database.

18 Claims, 10 Drawing Sheets

US 9,110,935 B2

GENERATE IN-MEMORY VIEWS FROM UNIVERSE SCHEMA

BACKGROUND

Today enterprises have a rich choice of databases. Customers may choose to migrate from their existing database to any new database offered by their enterprise vendors. The new database may comprise some new features or functionalities that are not available in the existing database. In such a scenario, customers may be required to understand the methodology in which such new features are to be designed in the new database. Typically this is a manual process where customers invest a lot of time and effort in understanding and designing the new features of the new database.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
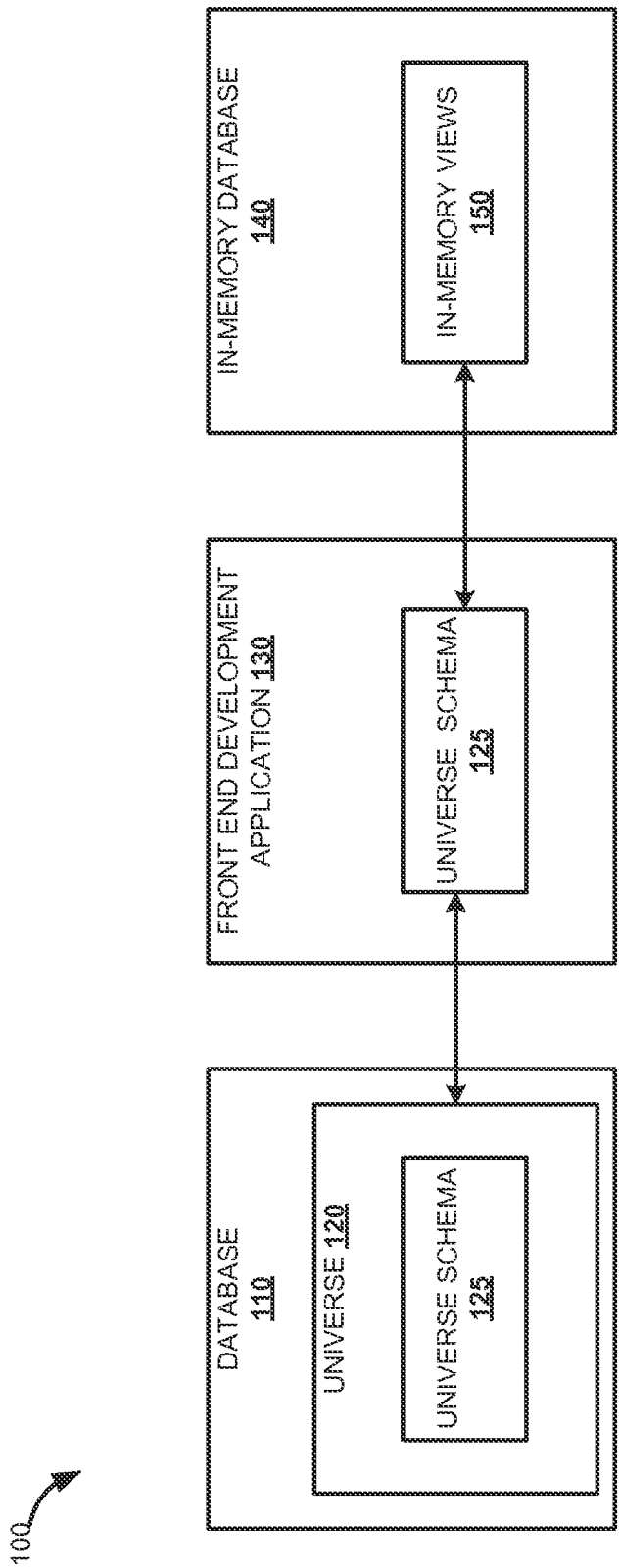
FIG. 1 is a block diagram illustrating generation of in-memory views from universe schema, according to an embodiment.

Embodiments of techniques for generating in-memory views from universe schema are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Enterprises store enormous amount of data in storage repositories such as databases. In any database, data is organized in a data structure supported by that database. Enterprises may have a need to migrate from one database to another, or to upgrade the version of database software being used. In some of these cases, a major data transformation process may be required, since the underlying data format can change significantly. In one embodiment, the modeling and accessing techniques of one database may significantly differ from other databases such as in-memory databases.

According to one embodiment, in-memory database typically relies on main memory for computation and storage. The in-memory database may be a relational database, an object oriented database or a hybrid of both. In-memory technology utilizes the maximum capabilities of the underlying hardware, to increase application performance. Information required for processing is usually available in the main memory, so computation and read operations can typically be executed in the main memory, without involving a hard disk input or output operation, for instance.

Traditionally, a database table is a two dimensional data structure with cells organized in rows and columns. However, according to one embodiment within an in-memory database, memory organization is linear. In a linear memory organization, data may be stored as a row store or a column store. In the row store, the fields of every row in the table are stored in a row sequentially, whereas in the column store, the fields of a column are stored in a column, in contiguous memory locations. Row based storage and column based storage, store data that can be modeled and accessed by various components of the in-memory management system, such as any front-end development application, database application, a query processing engine and the like.

Customers may choose to migrate from an existing database to the in-memory database for various reasons such as increased performance. In one of the steps of such a migration, data needs to be transformed and modeled to the data structure of the in-memory database. Typically, this is a manual process where customers spend a substantial amount of time in understanding the data structure, functionalities and modeling techniques of the in-memory database. In a first approach of manual modeling, customers create tables, views, etc., manually in the in-memory database. Second approach of manual modeling allows the customer to point their database connection to the in-memory database. In the second approach, if the existing database supports structured query language (SQL) queries in a particular syntax, after the manual modeling by pointing the database connection to the in-memory database, SQL queries syntax may vary, requiring significant effort by the customer to get the SQL syntax compatibility with the in-memory database. Therefore these manual approaches are inefficient and time consuming.

Thus, customers require a mechanism to perform data modeling to increase performance, by using a semantic layer of the existing database, at a front-end development application. Some databases have a semantic layer that is an intermediary layer between the database or data source, and dependent queries, reports or dashboards. The semantic layer enables an end-user to interact with data, without having to understand the complexities of database logic or the physical data that is stored. One such semantic layer is the Universe, which a file that contains a structure and layout of classes and objects, schema of tables, views and joins from the database, contexts, connection information to the database and mapping details of the structures to the database.

Such universe designed and built in any database can be used for modeling data in the in-memory database. The front-end development application can be built by implementing the required logic to enable such modeling. In one embodiment, the front-end development application may be a software application providing developers or customers the facility to work with the underlying database, a web application, a desktop application, a software-as-a-service application and the like, by coding software program or visually modeling a software program using an underlying prebuilt code.

In one embodiment, the in-memory database allows users to model data as tables and views. Tables are tabular data structures, each row identifying a particular entity, and each column having a unique name. The data fields of one row are called the attributes of the entity. Views are combinations and selections of data from tables, modeled to serve a specific purpose. Views can be a simple selection of some columns and/or rows from any table. Universe schema refers to the structure of the database, its tables and the relationships between them. Various types of databases comprising various types of schemas often contain many more tables and join relationships, both in number and type, depending on the business purpose.

FIG. 1 is a block diagram illustrating generation of in-memory views from universe schema, according to an embodiment. Universe 120 designed and built in a database 110 is used for modeling data in an in-memory database 140. The universe 120 is loaded in a front-end development application 130 to display a universe schema 125 contained in the universe 120. The universe schema 125 comprises tables and the join relationships between them. The logic built in the front-end development application 130 enables parsing the universe schema 125, to determine patterns matching the in-memory views such as attribute views and analytic views. Individual tables in the universe schema 125 act as entry points while parsing the universe schema 125. The determined pattern enables generation of the in-memory views 150. The generated in-memory views 150 are stored in the in-memory database 140.

In one embodiment, an exemplary sales universe created in the database 110 can be used to generate in-memory views 150 in the in-memory database 140. Sales universe is loaded and correspondingly a sales universe schema 210 can be viewed in the front-end development application (tool) 130, as shown in 200 of FIG. 2. The sales universe schema 210 comprising tables such as 'Country' 220, 'Region' 230, 'City' 240, 'Customer' 250, etc., along with the join relationships is displayed to the user in the front-end development application 130. The join relationship 225 between the 'Country' 220 table and the 'Region' 230 table indicates a one-to-many join relationship between them. One country can have many regions and hence the join relationship is one-to-many. The 'Country' 220 table has a primary key 'country_id' and the 'Region' 230 table has a corresponding foreign key 'country_id'. The join relationship 245 between the 'Customer' 250 table and the 'City' 240 table indicates a many-to-one relationship between them. The sales universe schema 210 is parsed by the logic built in the front-end development application 130, to determine patterns that would match the in-memory views of the in-memory database 140.

Figure 3:
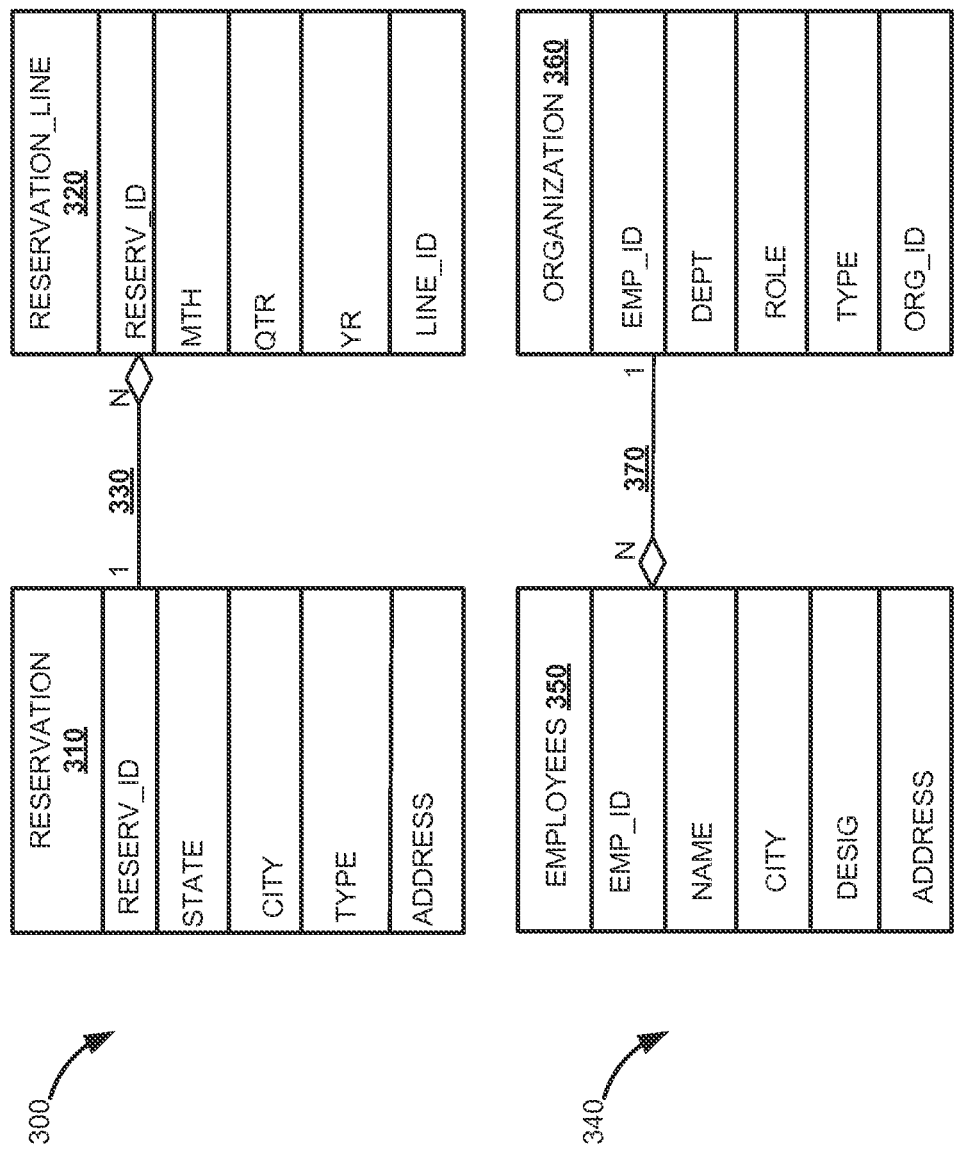
FIG. 3 illustrates attribute views of the in-memory database, according to one embodiment.

FIG. 3 illustrates attribute views of the in-memory database, in one embodiment. Attribute views are used to define join relationships between tables. For example, attribute views can be used to join 'Employees' table and 'Organization' table. Adjoining table holds an immediate join relationship with the table preceding or succeeding it. In one embodiment, the attribute view has a table with both one join and a one-to-many join relationship with an adjoining table. For example, 'Reservation' 310 table has both one join, and a one-to-many join relationship 330 with the adjoining table 'Reservation line' 320 table, and forms the attribute view as shown in 300. In another embodiment, the attribute view has a table with many-to-one join relationship with the adjoining table. For example, the 'Organization' 360 table has many-to-one join relationship 370 with the adjoining table 'Employees' 350, and forms the attribute view as shown in 340.

In one embodiment, a star schema consists of one or more fact tables referencing any number of dimension tables. A fact table is the central table in the star schema, and the fact table stores quantitative or factual measures of a business process for analysis. Dimension tables hold descriptive data that reflects the dimensions, or attributes of the business. Queries issued by the user use the join between the fact and dimension tables, and filter the data to return selected information. The fact table and the dimension table differ from each other in their use with the universe schema. For example, a sales manager analyzes revenue, actuals, budget etc. These items belong to the 'Sales_analysis' fact table as they are analyzed by the sales manager. Business dimensions by the item are product, line item etc., and they belong to the dimension table 'Product_info'. Therefore to analyze revenue by product, the query joins the 'Sales_analysis' fact table and the 'Product_info' dimension table and filter the data in these two tables to return selected information.

Figure 4:
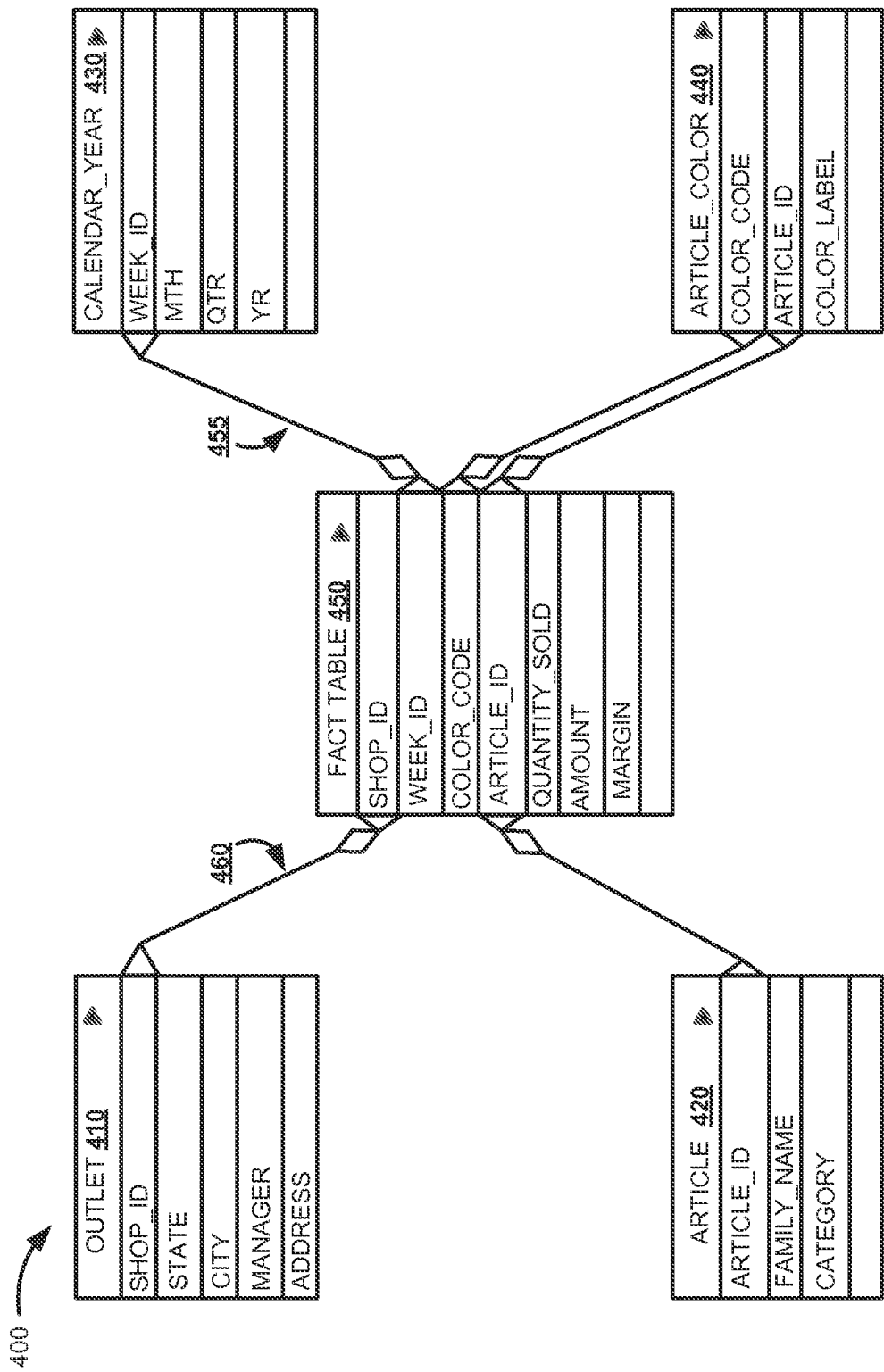
FIG. 4 illustrates an analytic view of the in-memory database, according to one embodiment.

FIG. 4 illustrates an analytic view of the in-memory database, in an embodiment. Analytic view 400 is based on at least one fact table 450 that contains transactional business data. The fact table 450 stores more than one numeric field such as quantity_sold, amount, margin, etc. The fact table 450 has many-to-one join relationship 455 with the adjoining dimension table 'Calendar_year' 430. Similarly, the fact table 450 has many-to-one join relationship 460 with the adjoining dimension table 'Outlet' 410. The fact table 450 has many-to-one join relationships with the adjoining tables such as 'Calendar_year' 430 table and 'Outlet' 410 table, in the star schema and accordingly forms the analytic view 400.

Figure 5:
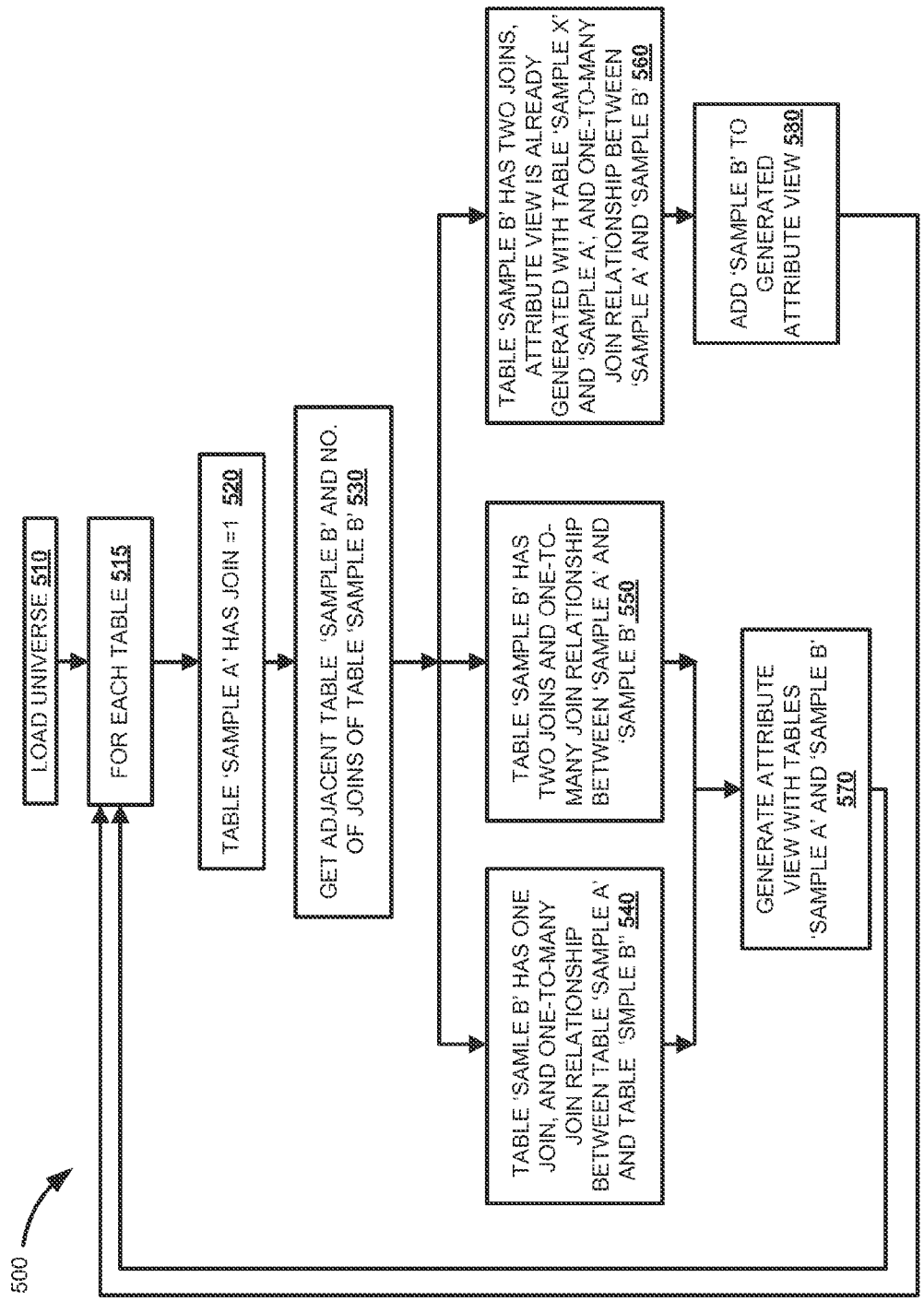
FIG. 5 illustrates a flow diagram of a method of generating attribute view, according to one embodiment.

FIG. 5 illustrates a flow diagram of a method of generating attribute view, according to one embodiment. Flow diagram 500 illustrates the logic involved in determining an 'attribute view pattern' corresponding to the attribute view and generating the determined attribute view. 'Attribute view pattern' is referred to as a 'first pattern'. At 510, the Universe is loaded in the front-end development application 130 and the universe schema 125 is available for the logic in the front-end development application 130 for parsing. At 515, for each table in the universe schema 125, the logic for determining the 'attribute view pattern' is executed. Merely for illustration, only representative tables such as 'first table', 'second table', 'Sample A', 'Sample X' are used. In one embodiment, the 'attribute view pattern' comprises a first table with both one join and a one-to-many join relationship with a second table. If table 'Sample A' has one join 520, the universe schema 125 is parsed to get an adjacent table 'Sample B' and the number of joins of table 'Sample B', as shown at 530.

If the adjacent table 'Sample B' has just one join, it is implied that the one join relationship is with table 'Sample A'. The logic to determine 'attribute view pattern' is executed to determine if table 'Sample A' has one-to-many join relationship with table 'Sample B' 540. Upon successful determination, the attribute view with 'Sample A' and 'Sample B' is generated as shown in 570. Alternatively, if the adjacent table 'Sample B' has two joins, and the table 'Sample A' has one-to-many join relationship with the table 'Sample B' 550, then also the attribute view with 'Sample A' and 'Sample B' is generated as shown in 570. In one embodiment, 'add to attribute view pattern' comprises the second table with two joins and a one-to-many join relationship with a third table, where the second table is already a part of the generated attribute view along with the first table. 'Add to attribute view pattern' is referred to as a 'third pattern'. In a scenario where the attribute view is already generated with a table 'Sample X' and the table 'Sample A'. Here the table 'Sample A' is adjacent to the table 'Sample X', and the table 'Sample B' is adjacent to the table 'Sample A'. The logic in 560 to determine the 'add to attribute view pattern' is executed, and accordingly it is determined if the adjacent table 'Sample B' has two joins and if the table 'Sample A' has one-to-many join relationship with the table 'Sample B'. Upon successful determination of 'add to attribute view pattern', the table 'Sample B' is added to the previously generated attribute view as shown in 580.

Figure 2:
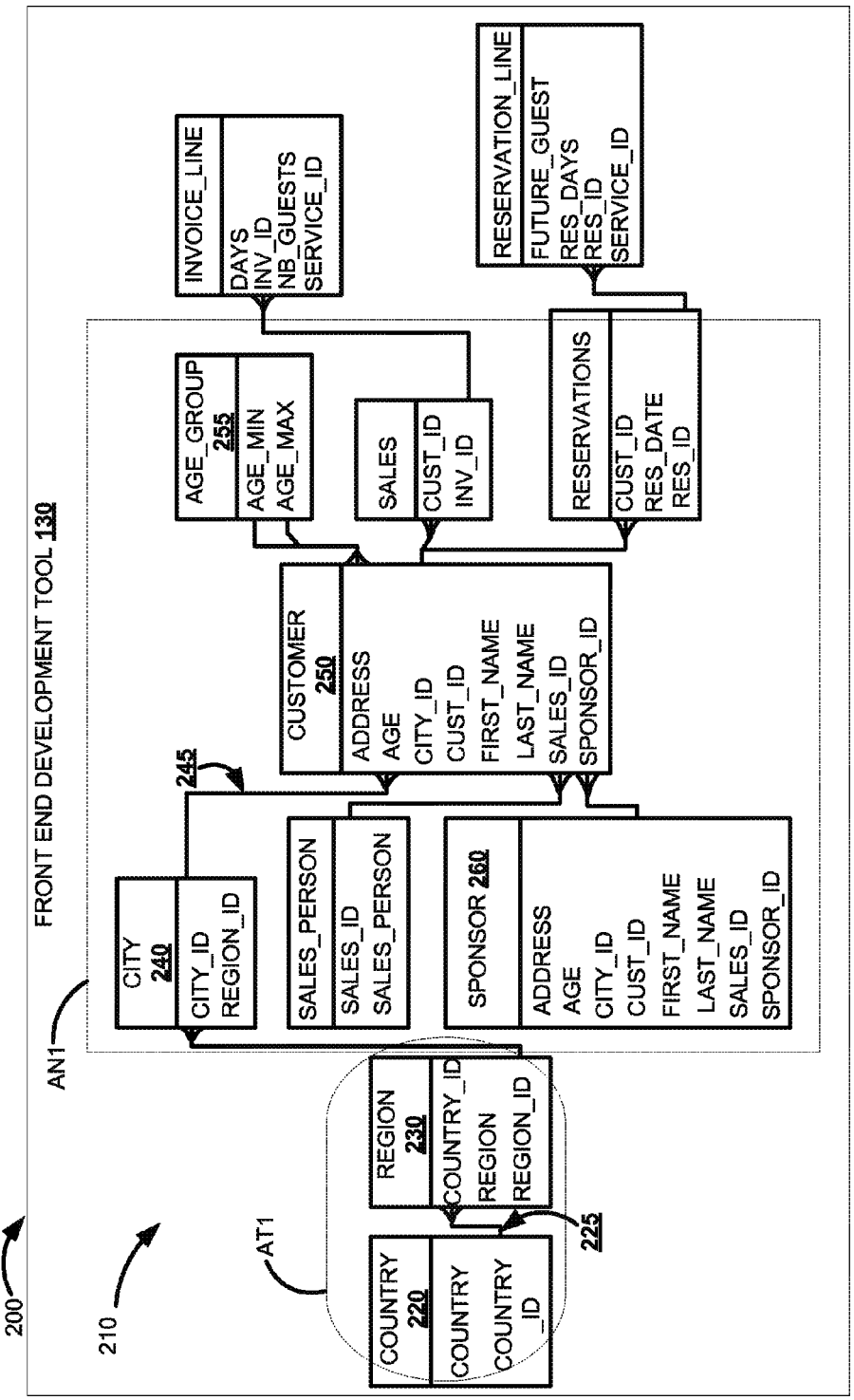
FIG. 2 illustrates an example universe schema, according to one embodiment.

An example embodiment to illustrate the logic involved in determining the 'attribute view pattern', 'add to attribute view pattern' and generating the attribute view with reference to the sales universe schema 210 of FIG. 2 is provided below. The 'Country' 220 table has one join, and the logic parses the sales universe schema 210 to get the adjacent table 'Region' 230 and the number of joins of 'Region' 230 table as '2'. Since the adjacent table 'Region' 230 has two joins, the logic in 550 is executed to determine if the 'Country' 220 table and the 'Region' 230 table have one-to-many join relationship with each other. Upon successful determination of the 'attribute view pattern', attribute view 'AT1' is generated with the 'Country' 220 table and the 'Region' 230 table. In a scenario where the 'City' 240 table has two joins, and the attribute view 'AT1' is already generated with the 'Country' 220 table and the 'Region' 230 table, the logic in 560 is executed to determine if the 'Region' 230 table has one-to-many join relationship with the 'City' 240 table. Upon successful determination of the 'add to attribute view pattern', the 'City' 240 table is added to the previously generated attribute view 'AT1'. In one embodiment, the execution of the logic involved in determining and generating the attribute view is repeated, until there are no more tables to parse in the sales universe schema 210, or a table with more than two joins is determined.

Figure 6:
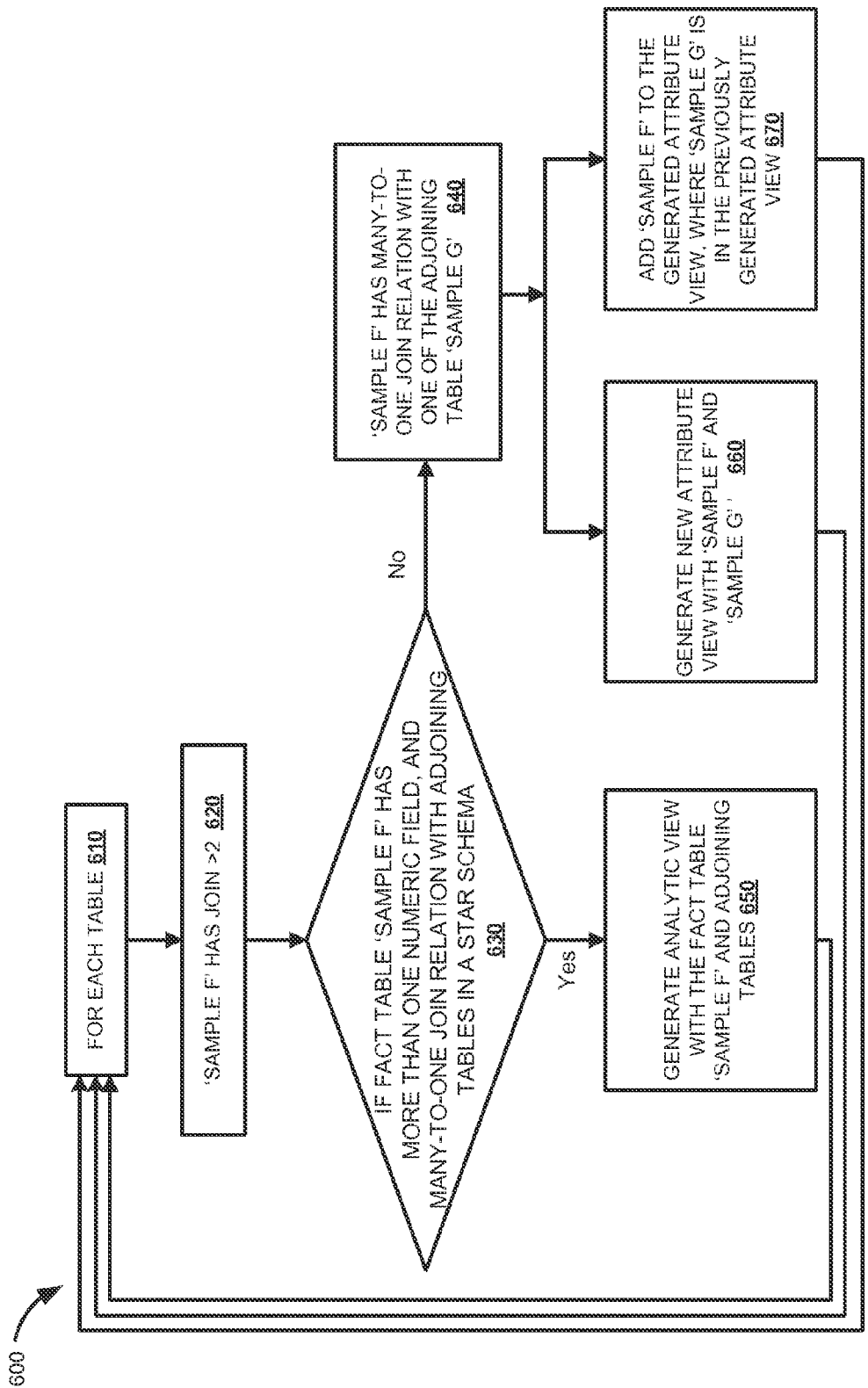
FIG. 6 illustrates a flow diagram of a method of generating analytic view, according to one embodiment.

FIG. 6 illustrates a flow diagram of a method of generating analytic view, according to one embodiment. Flow diagram 600 illustrates the logic involved in determining an 'analytic view pattern' corresponding to the analytic view, and generating the determined analytic view. 'Analytic view pattern' is referred to as a 'second pattern'. In one embodiment, the flow diagram 500 involved in determining the 'attribute view pattern' and generating the attribute view is executed before the logic in the flow diagram 600 is executed. At 610, the logic continues to parse the tables with more than two joins in the universe schema 125, and the logic for determining the 'analytic view pattern' is executed. In one embodiment, the 'analytic view pattern' comprises a fact table with more than two joins, more than one numeric field and a many-to-one join relationship with one or more adjoining tables in a star schema. The logic to determine the 'analytic view pattern' parses the universe schema 125 to determine if table 'Sample F' has more than two joins 620, and also determine if table 'Sample F' matches the criteria of the fact table as shown in 630.

In one scenario, the table 'Sample F' has more than one numeric field and many-to-one join relationship with the adjoining tables in the star schema. Upon successful determination of the 'analytic view pattern', the analytic view is generated with the fact table 'Sample F' and the adjoining tables as shown in 650. In another scenario, if the table 'Sample F' does not match the criteria of the fact table, the table 'Sample F' and an adjoining table 'Sample G' can be processed to determine if any 'new attribute view pattern', or 'add to attribute view pattern' can be determined. If the table 'Sample F' has many-to-one join relationship with the adjoining table 'Sample G' 640, a new attribute view can be generated with the tables 'Sample F' and 'Sample G' as shown in 660. Alternatively, if the table 'Sample F' has many-to-one join relationship with the adjoining table 'Sample G' 640, and the table 'Sample G' is already part of the previously generated attribute view, the table 'Sample F' is added to the previously generated attribute view as shown in 670. In one embodiment one attribute view can comprise one or more attribute views.

An example embodiment to illustrate the logic involved in determining the 'analytic view pattern' and generating the analytic view with reference to sales universe schema 210 of FIG. 2 is provided below. The logic determines if 'Customer' 250 table is the fact table. The 'Customer' 250 table has more than two joins, more than one numeric field, and many-to-one join relationship with the adjoining tables such as 'Age_group' 255 table, 'Sponsor' 260 table, 'City' 240 table, in the star schema. Upon successful determination of the 'analytic view pattern', analytic view 'AN1' is generated with the 'Customer' 250 table and the adjoining tables 'Age_group' 255, 'Sponsor' 260 and 'City' 240.

In a scenario where 'Customer' 250 table did not match the criteria for the fact table, the 'Customer' 250 table and the adjoining table 'City' 240 table can be processed to determine if any 'new attribute view pattern' or 'add to attribute view pattern' can be determined. If 'Customer' 250 table has many-to-one join relationship with one of the adjoining tables such as 'City' 240, the 'new attribute view pattern' matches, and a new attribute view can be generated with the 'Customer' 250 table and the 'City' 240 table. Alternatively, if the 'Customer' 250 table has many-to-one join relationship with the adjoining table 'City' 240, and the 'City' 240 table is already part of the previously generated attribute view 'AT1', the 'add to attribute view pattern' matches, and the 'Customer' 250 table is added to the previously generated attribute view 'AT1'.

In one embodiment, the data in the tables of the previously generated attribute view 'AT1' is instrumental in determining if the 'Customer' 250 table can be added to the previously generated attribute view 'AT1'. For example, if adding the 'Customer' 250 table to the previously generated attribute view 'AT1' results in data loss in the tables of 'AT1', a new attribute view is generated with the 'Customer' 250 table and the 'City' 240 table. This new attribute view can reside in 'AT1', and therefore one attribute view can reside within another attribute view. In one embodiment, the execution of the logic involved in determining the 'analytic view pattern' and generating the analytic view is repeated, until there are no more tables to parse in the sales universe schema 125.

Figure 7:
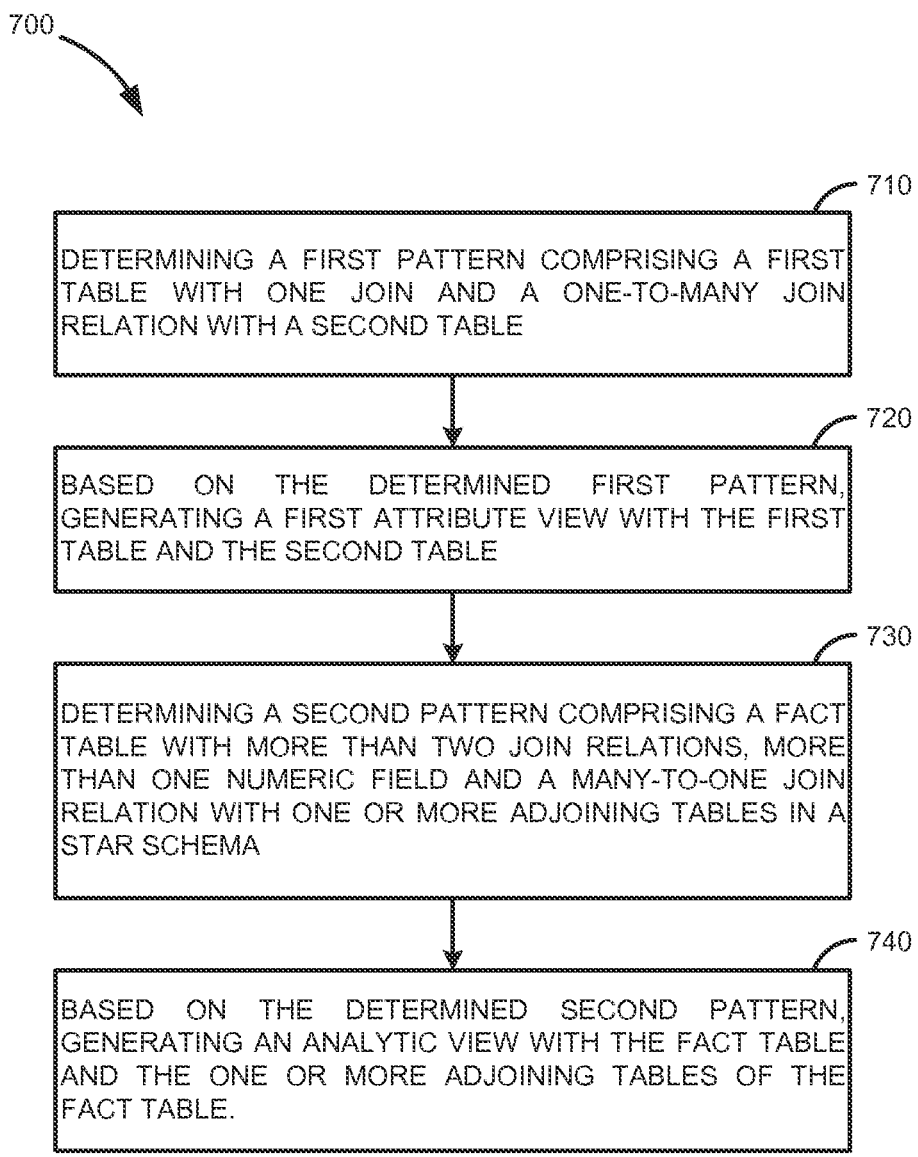
FIG. 7 illustrates a flow diagram of a method of generating in-memory views from the universe schema, according to one embodiment.

FIG. 7 illustrates a flow diagram 700 of a method of generating in-memory views from the universe schema, according to one embodiment. Universe 120 comprising the universe schema 125 is loaded in the front-end development application 130. The universe schema 125 defines relationships between the tables and joins. At 710, the logic built in the front-end development application 130 parses the tables in the universe schema 125, to determine if a 'first pattern' comprising a 'first table' with one join, and a one-to-many join relationship with a 'second table' can be determined. At 720, based on the determined 'first pattern', a first attribute view is generated with the 'first table' and the 'second table'.

At 730, the logic proceeds to parse the universe schema 125 to determine if a 'second pattern' comprising a fact table with more than two joins, more than one numeric field, and a many-to-one join relation with one or more adjoining tables in a star schema can be determined. At 740, based on the determined 'second pattern', the analytic view is generated with the fact table and the adjoining tables.

Figure 8:
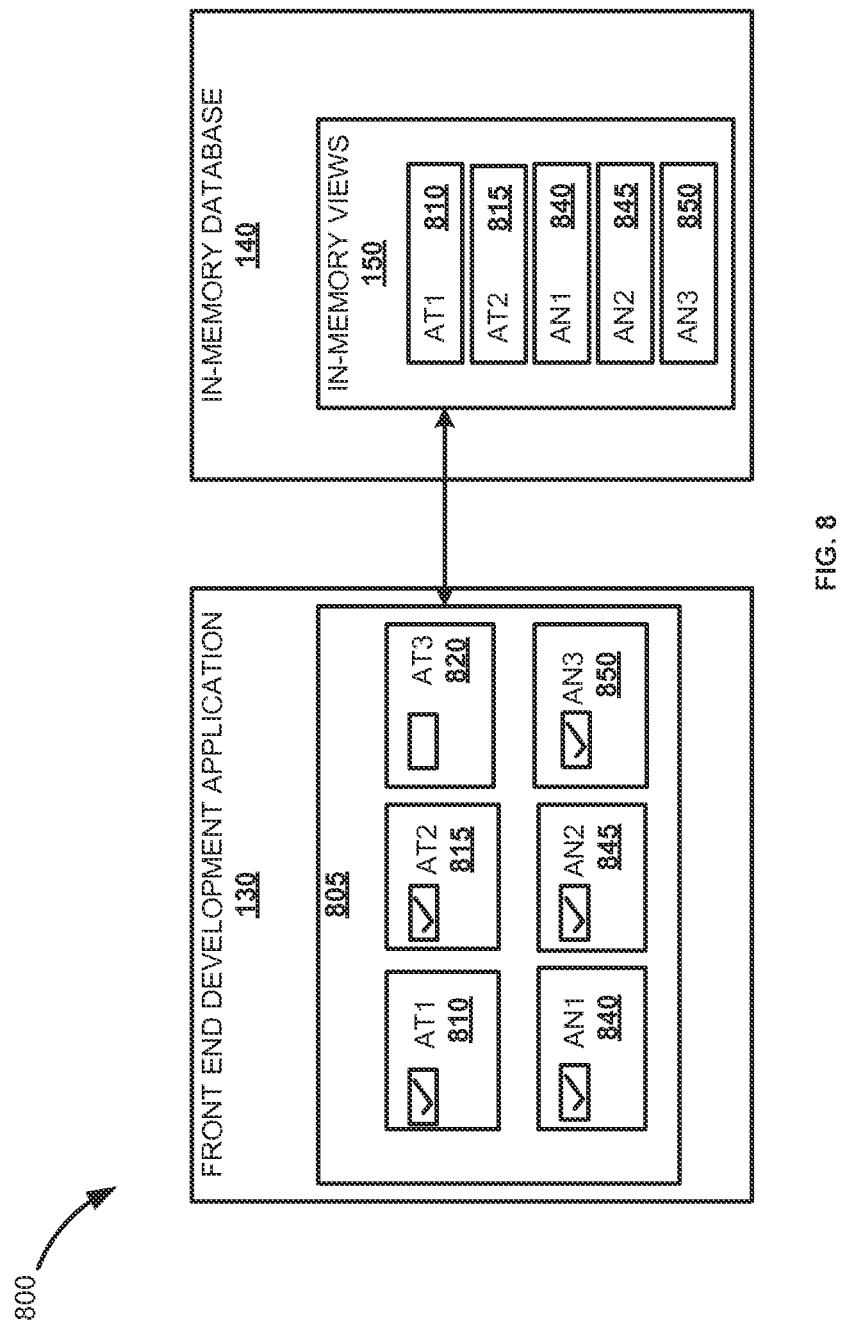
FIG. 8 illustrates selection and storing of generated attribute views and analytic views, according to one embodiment.

In one embodiment, the generated attribute views and analytic views can be displayed to the user for validation and selection as shown in 800 of FIG. 8. The selected attribute views and analytic views are stored in the in-memory database 140. FIG. 8 illustrates an exemplary user interface 805 in the front-end development application 130 for displaying the generated attribute views and analytic views. For example, the attribute view 'AT1' and the analytic view 'AN1' generated in FIG. 2 is displayed in the user interface 805, as 810 and 840 respectively. Similarly various attribute views such as 'AT2' 815, 'AT3' 820, and analytic views such as 'AN1' 840, 'AN2' 845 and 'AN3' 850 generated by the execution of the logic in the flow diagram 500 and the flow diagram 600 is displayed to the user in 805, for the user to validate and select.

Users can specify the selection of attribute views and analytic views in the indicated locations associated with the views. Accordingly the attribute views 'AT1' 810 and 'AT2' 815, and the analytic views 'AN1' 840. 'AN2' 845 and 'AN3' 850 are marked for selection by the user. Selected attribute views 'AT1' 810 and 'AT2' 815, and the selected analytic views 'AN1' 840, 'AN2' 845 and 'AN3' 850 are received by the logic in the front-end application 130, and stored in the in-memory database 140 as in-memory views 150. In-memory views 150 is shown storing 'AT1' 810, 'AT2' 815, 'AN1' 840. 'AN2' 845 and 'AN3' 850. Attribute view 'AT3' 820 is not selected for storing in the in-memory database 140 by the user, and accordingly the attribute view 'AT3' is not stored in the in-memory database 140. In one embodiment, the list of possible attribute views and analytic views with the tables used and the type of joins they have, are displayed to the user for selection.

Figure 9:
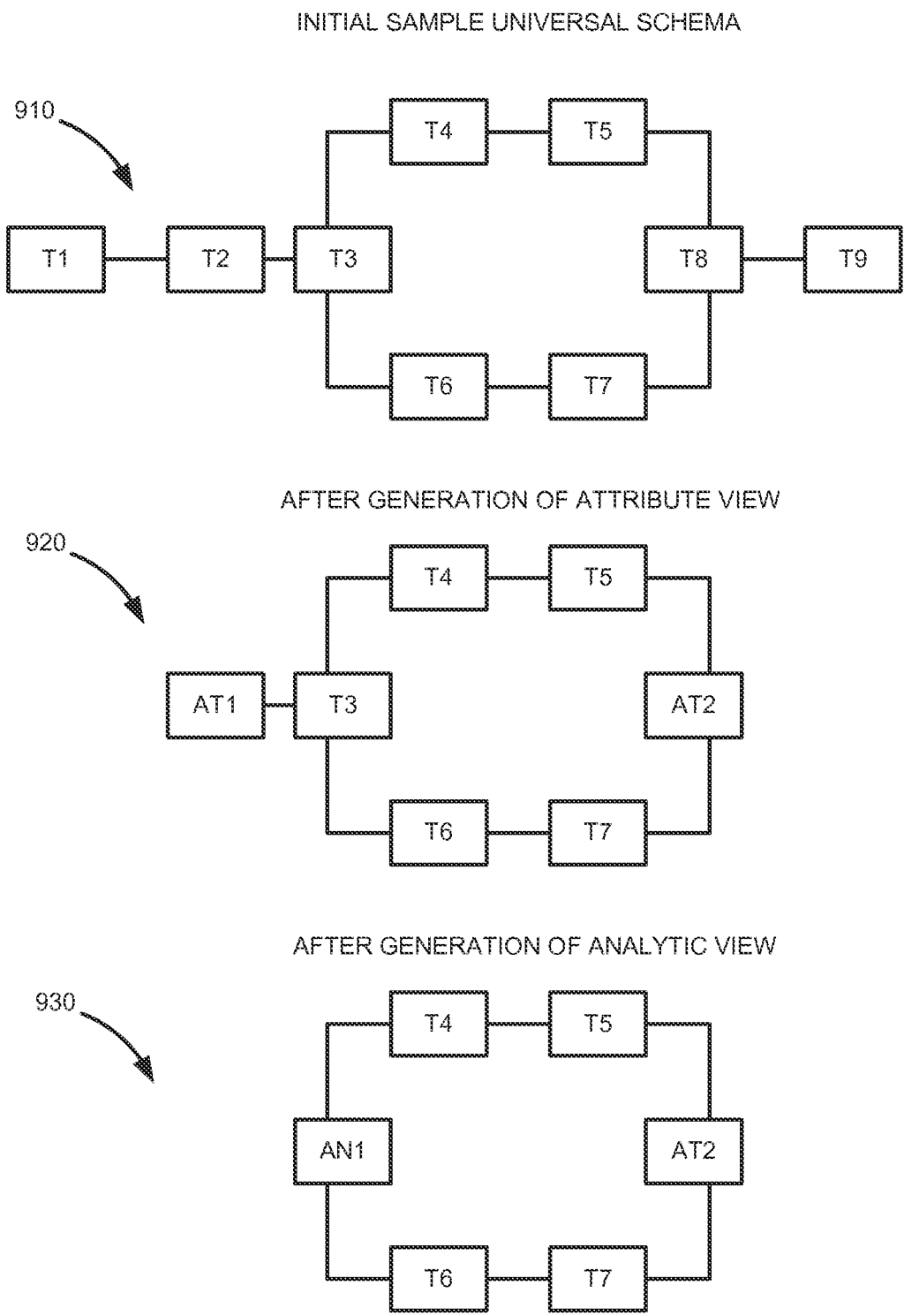
FIG. 9 illustrates high level display of a sample universal schema in the process of generation of attribute views and analytic views, according to one embodiment.

FIG. 9 illustrates the exemplary high level display of a sample universe schema generation of attribute views and analytic views. The sample universe schema has tables 'T1', 'T2' through 'T9'. In 910 the initial sample universe schema is displayed showing all the tables and join relationships between them. The logic in the flow diagram 500, involved in determining the 'attribute view pattern' corresponding to the attribute view, and generating the determined attribute view, is executed on the sample universe schema shown in 910. The sample universe schema is parsed, and the logic determines that the table 'T1' and the table 'T2'match the 'attribute view pattern'. Based on the determined 'attribute view pattern', attribute view 'AT1' is created with tables 'T1' and 'T2'. Tables 'T1' and 'T2' are replaced with the generated attribute view 'AT1'.

Similarly, on continuing to parse the sample universe schema, the logic determines that the table 'T9' and table 'T8' match the 'attribute view pattern'. Based on the determined 'attribute view pattern', attribute view 'AT2' is created with the tables 'T9' and 'T8'. The sample universe schema displaying the generated attribute views 'AT1' and 'AT2' is shown in 920. The logic in the flow diagram 600, involved in determining the 'analytic view pattern' corresponding to the analytic view, and generating the determined analytic view, is executed in the sample universe schema shown in 910. The sample universe schema is parsed and the logic determines that the table 'T3' matches the criteria of the fact table. The logic determines if the fact table 'T3', the adjoining tables 'T4', 'T6' and the tables in the attribute view 'AT1', match the 'analytic view pattern'. Based on the determined 'analytic view pattern', analytic view 'AN1' is created with tables 'T4', 'T6', and tables in the attribute view 'AT1'. The sample universe schema displaying the generated analytic view 'AN1' is shown in 930.

The various embodiments described above have a number of advantages. For example, for a customer requiring migration from 'database X' to the in-memory database, it is easy and convenient for the customers to use the universe schema in the 'database X' for modeling in the in-memory database, since the customer has prior knowledge and understanding of the universe schema. Thus, this approach eliminates the substantial time spent using manual approach of modeling in the in-memory database. Therefore, performance of modeling using the universe schema in the front-end application provides a significant improvement over the manual approach of modeling. The logic built in the front-end application reduces the time taken to generate in-memory views drastically. The display of the generated in-memory views in the front-end application provides ease of use for the customers in validation and selection of the in-memory views.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
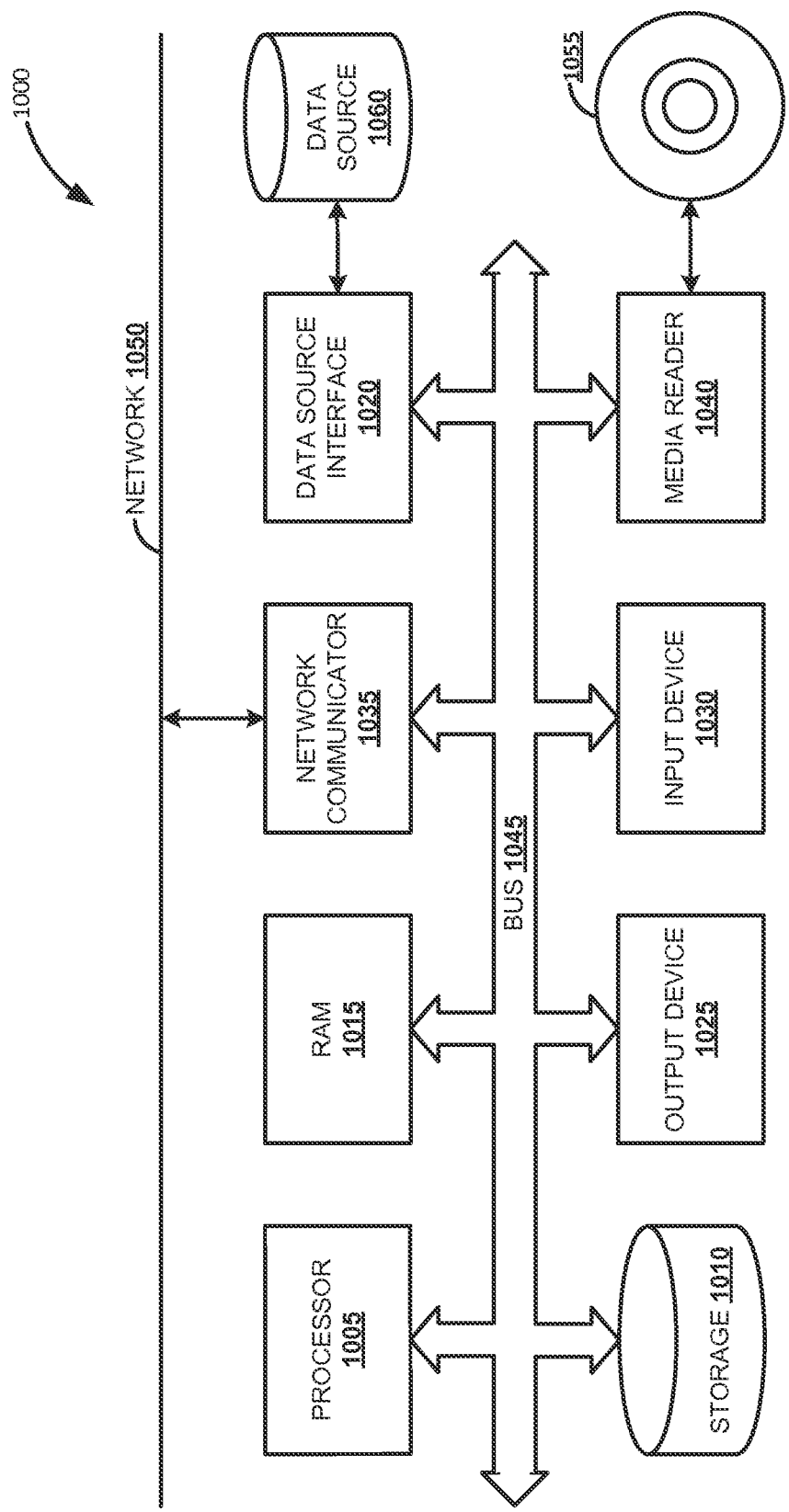
FIG. 10 is a block diagram of an exemplary computer system according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1335 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a mark-up language (e.g., XML data), transactional data, unstructured data (e.g., text files, screen scrapings), hierarchical data (e.g., data in a file system, XML data), files, a plurality of reports, and any other data source accessible through an established protocol, such as. Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   determine a first pattern comprising a first table with one join and a one-to-many join relationship with a second table;
   based on the determined first pattern, generate a first attribute view with the first table and the second table;
   determine a second pattern comprising a fact table with more than two joins, more than one numeric field and a many-to-one join relationship with one or more adjoining tables in a star schema;
   based on the determined second pattern, generate an analytic view with the fact table and the one or more adjoining tables of the fact table;
   determine a fourth pattern comprising a fourth table with more than two joins and a many-to-one join relationship with a fifth table, wherein the fourth table is not the fact table; and
   based on the determined fourth pattern, generate a second attribute view with the fourth table and the fifth table.

2. The article of manufacture of claim 1, further comprising instructions which when executed by the computer further causes the computer to:
   determine a third pattern comprising the second table with two joins and a one-to-many join relationship with a third table; and
   based on the determined third pattern, add the third table to the generated attribute view.

3. The article of manufacture of claim 1, further comprising instructions which when executed by the computer further causes the computer to:
   load a universe schema at a front-end development application, wherein the universe schema defines relationships between tables and joins; and
   parse the universe schema to traverse the tables.

4. The article of manufacture of claim 1, further comprising instructions which when executed by the computer further causes the computer to:
- display the generated attribute view and the generated analytic view in a front-end development application for user selection; and
- based on the user selection, store the selected attribute view and the selected analytic view in an in-memory database.

5. The article of manufacture of claim 1, wherein the attribute view is an in-memory attribute view and the analytic view is an in-memory analytic view.

6. The article of manufacture of claim 1, further comprising instructions which when executed by the computer further causes the computer to:
- determine a fifth pattern comprising a seventh table with more than two joins and a many-to-one join relationship with the second table, wherein the seventh table is not the fact table and the second table is in the first attribute view; and
- based on the determined fifth pattern, add the seventh table to the generated first attribute view.

7. A computer implemented method for generating in-memory views from universe, the method comprising:
- determining a first pattern comprising a first table with one join and a one-to-many join relationship with a second table;
- based on the determined first pattern, generating a first attribute view with the first table and the second table;
- determining a second pattern comprising a fact table with more than two joins, more than one numeric field and a many-to-one join relationship with one or more adjoining tables in a star schema;
- based on the determined second pattern, generating an analytic view with the fact table and the one or more adjoining tables of the fact table;
- determining a fourth pattern comprising a fourth table with more than two joins and a many-to-one join relationship with a fifth table, wherein the fourth table is not the fact table; and
- based on the determined fourth pattern, generate a second attribute view with the fourth table and the fifth table.

8. The method of claim 7, further comprising:
- determining a third pattern comprising the second table with two joins and a one-to-many join relationship with a third table; and
- based on the determined third pattern, add the third table to the generated attribute view.

9. The method of claim 7, further comprising:
- loading a universe schema at a front-end development application, wherein the universe schema defines relationships between tables and joins; and
- parsing the universe schema to traverse the tables.

10. The method of claim 7, further comprising:
- displaying the generated attribute view and the generated analytic view in a front-end development application for user selection; and
- based on the user selection, storing the selected attribute view and the selected analytic view in an in-memory database.

11. The method of claim 7, wherein the attribute view is an in-memory attribute view and the analytic view is an in-memory analytic view.

12. The method of claim 7, further comprising:
- determining a fifth pattern comprising a seventh table with more than two joins and a many-to-one join relationship with the second table, wherein the seventh table is not the fact table and the second table is in the first attribute view; and
- based on the determined fifth pattern, add the seventh table to the generated first attribute view.

13. A computer system for in-memory analysis scenario builder, comprising:
- a computer memory to store program code; and
- a processor to execute the program code to:
  - determine a first pattern comprising a first table with one join and a one-to-many join relationship with a second table;
  - based on the determined first pattern, generate a first attribute view with the first table and the second table;
  - determine a second pattern comprising a fact table with more than two joins, more than one numeric field and a many-to-one join relationship with one or more adjoining tables in a star schema; and
  - based on the determined second pattern, generate an analytic view with the fact table and the one or more adjoining tables of the fact table;
  - determine a fourth pattern comprising a fourth table with more than two joins and a many-to-one join relationship with a fifth table, wherein the fourth table is not the fact table; and
  - based on the determined fourth pattern, generate a second attribute view with the fourth table and the fifth table.

14. The system of claim 13, wherein the processor further executes the program code to:
- load a universe schema at a front-end development application, wherein the universe schema defines relationships between tables and joins; and
- parse the universe schema to traverse the tables.

15. The system of claim 13, wherein the processor further executes the program code to:
- display the generated attribute view and the generated analytic view in a front-end development application for user selection; and
- based on the user selection, store the selected attribute view and the selected analytic view in an in-memory database.

16. The system of claim 13, wherein the attribute view is an in-memory attribute view and the analytic view is an in-memory analytic view.

17. The system of claim 13, wherein the processor further executes the program code to:
- determine a fifth pattern comprising a seventh table with more than two joins and a many-to-one join relationship with the second table, wherein the seventh table is not the fact table and the second table is in the first attribute view; and
- based on the determined fifth pattern, add the seventh table to the generated first attribute view.

18. A computer system of claim 13, wherein the processor further executes the program code:
- determine a third pattern comprising the second table with two joins and a one-to-many join relationship with a third table; and
- based on the determined third pattern, add the third table to the generated attribute view.

* * * * *